United States Patent [19]

Yamazaki

[11] 3,735,290

[45] May 22, 1973

[54] COMPRESSING AND/OR EXPANDING SYSTEM COMPRISING FIXED AND VARIABLE FREQUENCY CHARACTERISTIC CHANGING CIRCUITS

[75] Inventor: Nasami Yamazaki, Zama, Japan

[73] Assignee: Victor Company of Japan, Ltd., Yokohama, Kanagawa, Japan

[22] Filed: Apr. 18, 1972

[21] Appl. No.: 245,124

[52] U.S. Cl. ........................333/14, 325/65, 330/86, 330/107, 333/17

[51] Int. Cl. ............................................H04b 1/64

[58] Field of Search ..................333/14, 17; 179/1 P, 179/100.2 K; 325/62, 65; 330/86, 107, 145

[56] References Cited

UNITED STATES PATENTS

| | | | |
|---|---|---|---|
| 3,304,369 | 2/1967 | Dreyfus | 333/14 X |
| 3,535,550 | 10/1970 | Kang | 333/14 X |

*Primary Examiner*—Paul L. Gensler
*Attorney*—Louis Bernat

[57] ABSTRACT

A compressing and/or expanding circuit comprises a first circuit consisting of a frequency characteristic changing circuit having a specific fixed frequency-response characteristic and a frequency characteristic changing circuit including a control element and having a frequency response characteristic variable between a characteristic complementary with said specific fixed frequency response characteristic and a flat characteristic, an amplifier connected in series with the first circuit, and a second circuit provided in a feedback loop associated with the amplifier, which has the same circuit structure as the first circuit. In the compressing circuit, the first circuit, applied with a control signal voltage in response to the level of an input signal, causes its frequency response to vary, whereas the second circuit, applied with a constant voltage, manifests a flat frequency response characteristic. In the expanding circuit, the first circuit, applied with a constant voltage, manifests a flat frequency response characteristic, whereas the second circuit, applied with a control signal voltage corresponding to the signal level, causes its frequency response to vary.

11 Claims, 6 Drawing Figures

COMPRESSING AND/OR EXPANDING SYSTEM COMPRISING FIXED AND VARIABLE FREQUENCY CHARACTERISTIC CHANGING CIRCUITS

BACKGROUND OF THE INVENTION

This invention relates to a compressing and/or expanding circuit and, more particularly, to a circuit for reducing noises and improving the signal to noise ratio by using a compressor and an expandor.

A signal transmission system, of the type contemplated herein, includes a communication system in which a signal is transmitted and received, and a recording and reproducing system in which a signal is recorded on and reproduced from a reading medium such as a magnetic tape or a record disc. A known method for reducing noises in such a system is by adopting a compression and expansion system, which employs a compressor and an expandor.

A related disclosure is shown in Takahashi et al. U.S. Pat. application Ser. No. 149,687, filed June 3, 1971, entitled "NOISE REDUCTION SYSTEM AND APPARATUS USING A COMPRESSION AND EXPANSION SYSTEM," and assigned to the assignee of the present application. The present application relates to a compressor and a control circuit for controlling the compressor in response to the output of the compressor are provided on the signal transmission side and an expandor and a control circuit for controlling the expandor in response to the input to the expandor are provided on the signal receiving side. The compressor has a variable attenuation network including a control element. The expandor is constructed as a negative feedback amplifier including a control element in its negative feedback loop. If the input signal to the compressor is expressed as X, the output signal of the compressor (i.e., the input signal to the expandor) as Y, the output signal of the expandor as Z, the compression ratio in the compressor as K, the amplification degree of the expandor as A and the feedback ratio as $\beta$, and the relationship between the compression ratio K and the feedback ratio $\beta$ is selected to be $K = \beta$, the relationship between the input and output signals X and Y of the compressor may be expressed by the equation $$Y = KX \quad (1)$$

The relationship between the input and output signals Y and Z may be expressed by the equation $$Z = AY/1 + A\beta) \quad (2)$$

If a relationship $A >> 1$ is satisfied in the equation (2), the equation (2) may also be expressed as $$Z = Y/\beta \quad (3)$$

From the equations (1) and (3) under the condition of $K = \beta$, the relationship between the output of the expandor and the input of the compressor will be $$Z = KX/\beta = X \quad (4)$$

Accordingly, an input-output characteristic of the signal in the whole compression and expansion system becomes linear and a noise which occurs in the transmission path can effectively be reduced.

The above described system, however, has a problem that distortion of signal occurs due to characteristics of gain control elements provided in the compressor and expandor. Semiconductor elements (e.g., a transistor and a FET) commonly used as control elements have a characteristic that they show a large value of resistance when a control signal voltage is small and a small value of resistance when the control signal voltage is large. On the other hand, a control signal v. resistance characteristic required for the compressor and the expandor is opposite to the above described characteristic of semiconductor elements. Hence, semiconductors by themselves are not suitable for use as the control elements in the compressor and expandor.

The control characteristics of the control element are also affected by changes in temperature or in bias power supply voltage to become the causes for the occurrence of signal distortion.

SUMMARY OF THE INVENTION

Accordingly, it is a general object of this invention to provide a novel and useful compressing and/or expanding circuit which will overcome the above described disadvantages of the prior art.

Another object of this invention is to provide a circuit capable of performing optimum signal compression and/or expansion without causing signal distortion due to a characteristic curve of a control element per se used in the variable frequency characteristic changing circuit for varying a frequency response in accordance with the input signal level or causing degradation in the signal-to-noise ratio due to changes in the characteristics of the control element, which are caused, in turn, by external origins such as changes in temperature or in bias power supply voltage.

A further object of this invention is to provide a compressing and/or expanding circuit so designed that the compressing and expanding circuits have the same circuit construction, and either circuit can be operated by a switchover operation as required. The present circuit can find most suitable application in systems such as a magnetic recording and reproducing apparatus in which the compressor and the expandor can never be operated simultaneously.

Further objects and features of the invention will be apparent from the following detailed description when read in conjunction with the accompanying drawings, in which like parts are designated by like reference numerals and characters.

DETAILED DESCRIPTION

Figure 1:
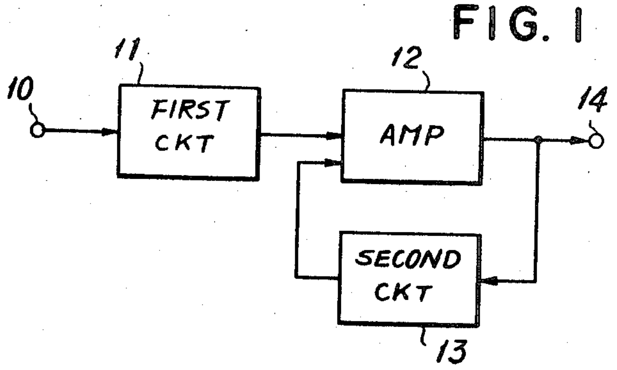
FIG. 1 is a block diagram showing the essential components of one embodiment of a compression system or expansion system in the circuit of the present invention and indicating the principle thereof.

Referring first to FIG. 1 in the form of a block diagram indicating the principle of one embodiment of a compression system or an expansion system in the system of the invention, a signal introduced through an input terminal 10 passes through a first circuit having a transmission quantity $\theta_1$ and is then supplied to an amplifier 12 having an amplification factor $\mu$. A part of the output of the amplifier 12 is returned as a negative feedback to the input of the amplifier 12 by way of a second circuit 13 having a transmission quantity $\theta_2$. Accordingly, an output signal having a characteristic $(\theta_1 - \theta_2)$, that is, the difference of the two transmission quantities $\theta_1$ and $\theta_2$ is obtained at the output terminal connected to the output side of the amplifier 12. In this instance, circuits having identical circuit constructions respectively provided with control elements are used for these first and second circuits having transmission quantities $\theta_1$ and $\theta_2$.

Figure 2:
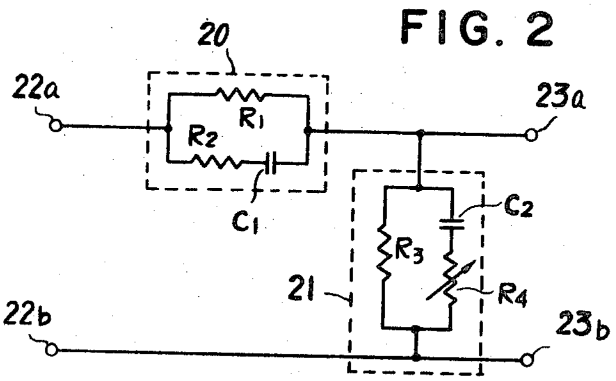
FIG. 2 is a circuit diagram showing one embodiment of circuit construction of one of the blocks shown in FIG. 1.

The circuit construction of the first circuit 11 (or the second circuit 13) is shown in FIG. 2. The circuit 11 (or 13) consists mainly of a fixed frequency characteristic changing circuit 20 having a specific predetermined fixed frequency response characteristic and a variable frequency characteristic changing circuit 21 having a variable frequency response in response to the input signal level. The fixed frequency characteristic changing circuit 20 is connected in a line between an input terminal 22*a* and an output terminal 23*a*, while the variable frequency characteristic changing circuit 21 is connected between lines in two output terminals 23*a* and 23*b*, whereby the circuits 20 and 21 are connected in an inverted L shape connection.

Figure 3:
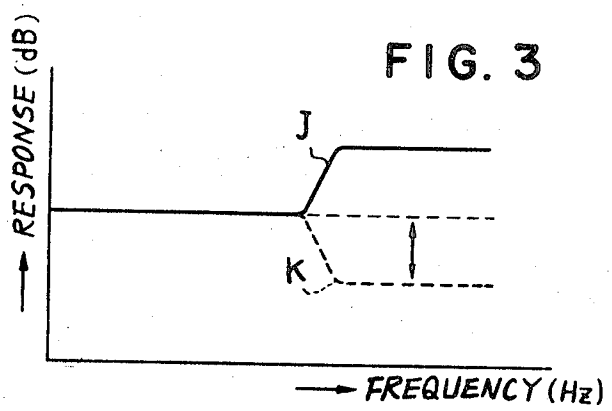
FIG. 3 is a graphical representation indicating the frequency response characteristics of respective circuit parts in the circuit shown in FIG. 2.

The fixed frequency characteristic changing circuit 20 is composed of a circuit in which a resistor $R_1$ and a series combination of a resistor $R_2$ and a capacitor $C_1$ are connected in parallel. Therefore, the circuit 20 has a specific fixed frequency response characteristic determined by the selection of resistance and capacitance values of the resistors $R_1$ and $R_2$ and the capacitor $C_1$. An embodiment of the fixed frequency response characteristic of the circuit 20 is shown by a curve J in FIG. 3, which increases the level in high frequency band. The variable frequency characteristic changing circuit 21 is composed of a circuit in which a resistor $R_3$ and a series combination of a capacitor $C_2$ and a variable resistor element $R_4$ are connected in parallel. The variable frequency characteristic changing circuit 21 has a response which can be varied by the selection of resistance and capacitance values of the resistor $R_3$, the variable resistor element $R_4$, and the capacitor $C_2$. An embodiment of the variable frequency response characteristic of the circuit 21 is shown by a dotted curve K in FIG. 3. This variable frequency response characteristic varies between a characteristic complementary with the characteristic curve J and a flat characteristic. The variable resistor element $R_4$ is a control element consisting of a semiconductor the resistance of which is varied in response to the input signal level, such as a transistor, a field-effect transistor (FET), etc.

Now, the values of resistances and capacitances of the resistors $R_1$, $R_2$, $R_3$, and $R_4$ and the capacitors $C_1$ and $C_2$ will be expressed by the same symbols as those used for these circuit elements as a measure for convenience. Then, each of the circuits 20 and 21 becomes a constant-resistance network, provided the constants of these circuit elements meet the following equation.

$$R_1/R_3 = R_2/R_4 = C_2/C_1 = \text{constant} \quad (1)$$

In this case, the characteristic J of the circuit 20 and the characteristic K of the circuit 21 become complementary with each other. As a consequence, the frequency response characteristic of the overall network (namely, the first circuit 11) connected across the input terminals 22*a* and 22*b* and the output terminals 23*a* and 23*b* becomes flat.

If the resistance $R_4$ of the variable resistor element $R_4$ is selected larger than that given by the equation (1) so that the constants of the circuit elements meet the relationship $$R_1/R_3 = C_2/C_1 > R_2/R_4 \quad (2)$$

the frequency characteristic K of the circuit 21 becomes substantially flat. As a consequence, the frequency response characteristic of the overall network consisting of the circuits 20 and 21 will become a high frequency band reinforced type in which the signal level is reinforced at high frequencies.

If the resistance $R_4$ of the variable resistor element $R_4$ is lower than the value given by the equation (1), that is, if there is the relationship among the constants of the circuit elements that can be expressed as $$R_1/R_3 = C_2/C_1 < R_2/R_4 \quad (3)$$

the frequency response characteristic of the overall network will become a high frequency band attenuated type in which the signal level is attenuated at high frequencies.

Figure 4:
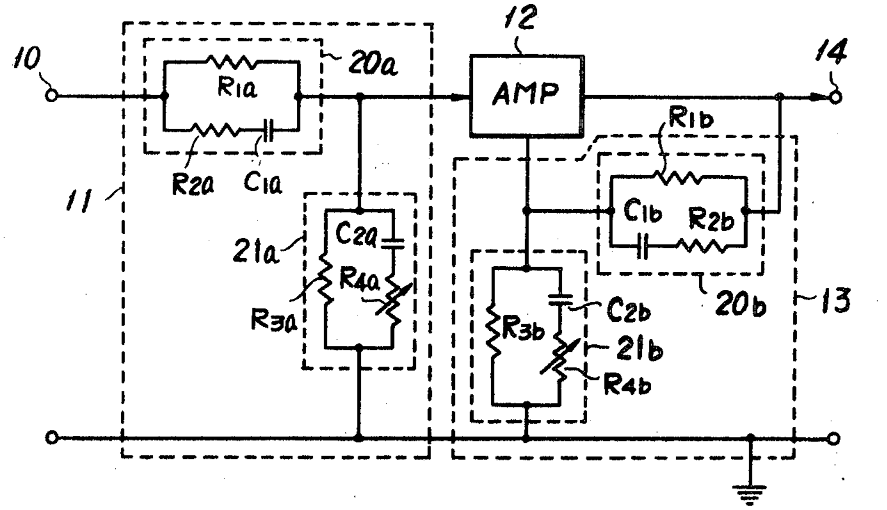
FIG. 4 is a circuit diagram of the block diagram shown in FIG. 1 in which the circuit shown in FIG. 2 is applied.

Referring to FIG. 4 which shows a circuit diagram equivalent to the block diagram of FIG. 1, it will be seen that the first circuit 11 consists of a fixed frequency characteristic changing circuit 20*a* and a variable frequency characteristic changing circuit 21*a*, while the second circuit 13 consists of a fixed frequency characteristic changing circuit 20*b* and a variable frequency characteristic changing circuit 21*b*.

The circuits 20*a* and 20*b* are substantially the same in circuit construction. Likewise, the circuits 21*a* and 21*b* are substantially the same in circuit construction.

The circuit elements in the circuits 20*a* (or 21*a*) and 20*b* (or 21*b*) corresponding to those connected in the circuit 20 (or 21) are indicated by the same reference symbols bearing a suffix *a* or *b*.

In order to construct a compressor by employing the circuit shown in FIG. 4, the constants of the circuit elements in the first circuit 11 and in the second circuit 13 need to be selected to meet the following conditions. The frequency response characteristic of the first circuit 11 becomes a high frequency band reinforced type for a low input signal level and flat one for an input signal level exceeding a predetermined value. The frequency response characteristic of the second circuit 13 is made flat irrespective of the input signal level. On the other hand, in order to construct an expandor by using the circuit of FIG. 4, the constants of the circuit elements in the first circuit 11 and the second circuit 13 need to be selected to meet the following conditions. The frequency response characteristic of the first circuit 11 is flat irrespective of the input signal level. The frequency response characteristic of the second circuit 13 becomes a high frequency band reinforced type for a low input signal level and flat one for an input signal level exceeding a predetermined value. Incidentally, the input and output characteristic of the amplifier 12 is designed to manifest a frequency response opposite to that of the circuit 13 provided in the negative feedback circuit. Therefore, the circuit shown in FIG. 4 operates as an expandor by causing the frequency response characteristic of the circuit 13 to vary in response to the input signal level.

The circuit shown in FIG. 2 is designed to have a frequency response which is either reinforced or attenuated in a frequency band higher than a certain frequency in response to the input signal level. There should be no objection, however, for composing a circuit structure such that a frequency response for a particular frequency band only may be varied in response to the input signal level in such a way as a band-pass filtering characteristic mode.

As will be easily understood from the circuit construction shown in FIG. 4, the circuit 11 and 13 manifest opposite actions with respect to a signal. Accordingly, the signal distortions caused by the characteristics themselves of the control elements $R_{4a}$ and $R_{4b}$ in the circuits 21*a* and 21*b* contained in the circuits 11 and 13 or such distortions attributable to changes in the ambient temperature or in the bias voltage are cancelled by each other through the circuits 11 and 13. Consequently, a compressor or an expandor employing the circuit construction shown in FIG. 4 contributes greatly to the reduction of noise in a signal being transmitted.

Figure 5:
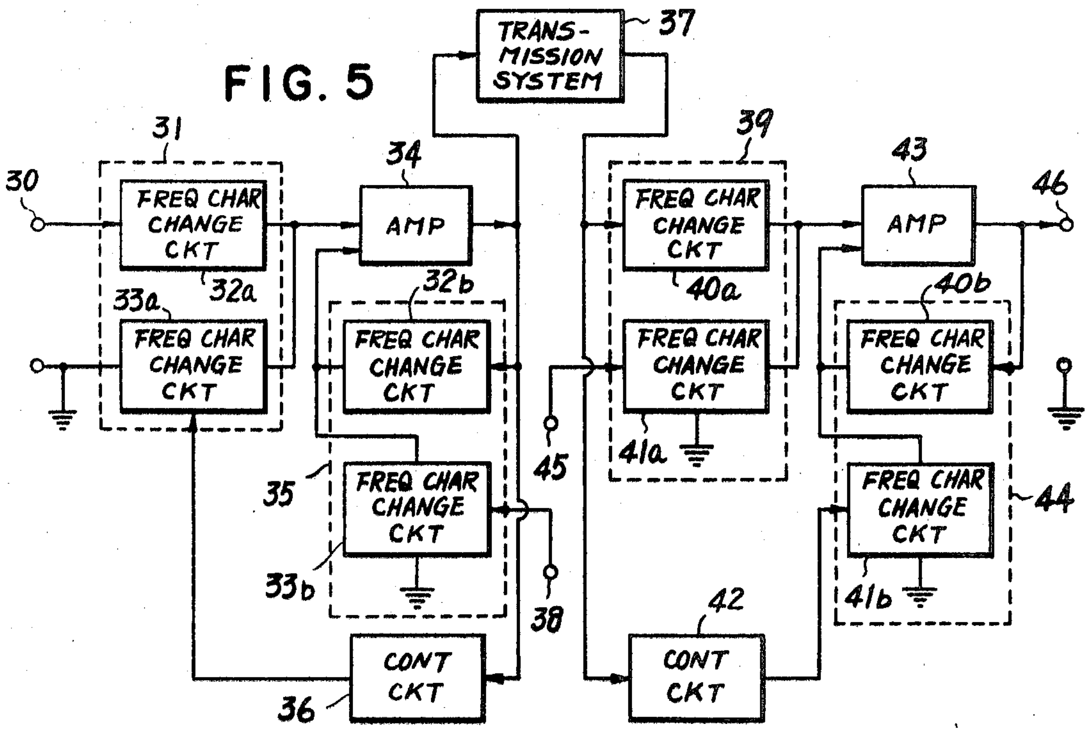
FIG. 5 is a block diagram of one embodiment of a compandor system according to the invention.

Referring to FIG. 5 which shows an embodiment of the compandor system according to this invention, it will be seen that a signal entering the compressor system through an input terminal 30 is fed to a first circuit 31 consisting of a fixed frequency characteristic changing circuit 32*a* and a variable frequency characteristic changing circuit 33*a*. The first circuit 31 corresponds to the previously mentioned first circuit 11 provided with a frequency response characteristic which becomes a high frequency band reinforced type for a low input signal level and flat for an input signal level exceeding the predetermined value. The output signal of the first circuit 31 is amplified by an amplifier 34 corresponding to the amplifier 12, and the amplified signal is delivered to a recording and reproducing system incorporating a recording medium or a transmission channel (hereinafter they are briefly referred to as a transmission system) 37.

Part of the output of the amplifier 34 is fed to both the second circuit 35 consisting of a fixed frequency characteristic changing circuit 32*b* and a variable frequency characteristic changing circuit 33*b* and to a control circuit 36. A constant bias voltage is applied to a control element in the frequency characteristic changing circuit 33*b* contained in the second circuit 35 from a constant-voltage power supply through a terminal 38. Therefore, the second circuit 35 corresponds to the second circuit 13 as described previously which is designed to have a flat frequency response regardless of the input signal level. The control circuit 36 develops a control signal voltage corresponding to the input signal level. The output control signal of the control circuit 36 is applied to a control element in the variable frequency characteristic changing circuit 33*a*, contained in the first circuit 31, whereby the resistance value of the control element is caused to vary.

A compressed signal transmitted in the transmission system 37 (or reproduced from a recording medium in the case of a recording and reproducing system) is fed to both a third circuit 39 and a control circuit 42 contained in the expansion system. The third circuit 39 consists essentially of a fixed frequency characteristic changing circuit 40*a* and a variable frequency characteristic changing circuit 41*a*. A constant bias voltage is applied to a control element in the frequency characteristic changing circuit 41*a* from a constant-voltage power supply terminal 45. Accordingly, the third circuit 39 corresponds to the first circuit 11 which is designed to have a flat frequency response regardless of the input signal level as mentioned previously. An output signal of the third circuit 39 is amplified by an amplifier 43 and the amplified signal output is derived from a terminal 46.

Part of the output of the amplifier 43 is fed to a fourth circuit 44 consisting of a fixed frequency characteristic changing circuit 40*b* and a variable frequency characteristic changing circuit 41*b*. A control signal voltage corresponding to the input signal level is applied to a control element in the variable frequency characteristic changing circuit 41*b* from a control circuit 42. The fourth circuit 44 corresponds to the second circuit 13 having a frequency response characteristic which becomes a high frequency band reinforced type for a low input signal level and flat for an input signal level exceeding the predetermined value.

As a consequence, a signal with an improved signal-to-noise ratio is available from an output terminal 46 as a result of the compressing and expanding action.

Figure 6:
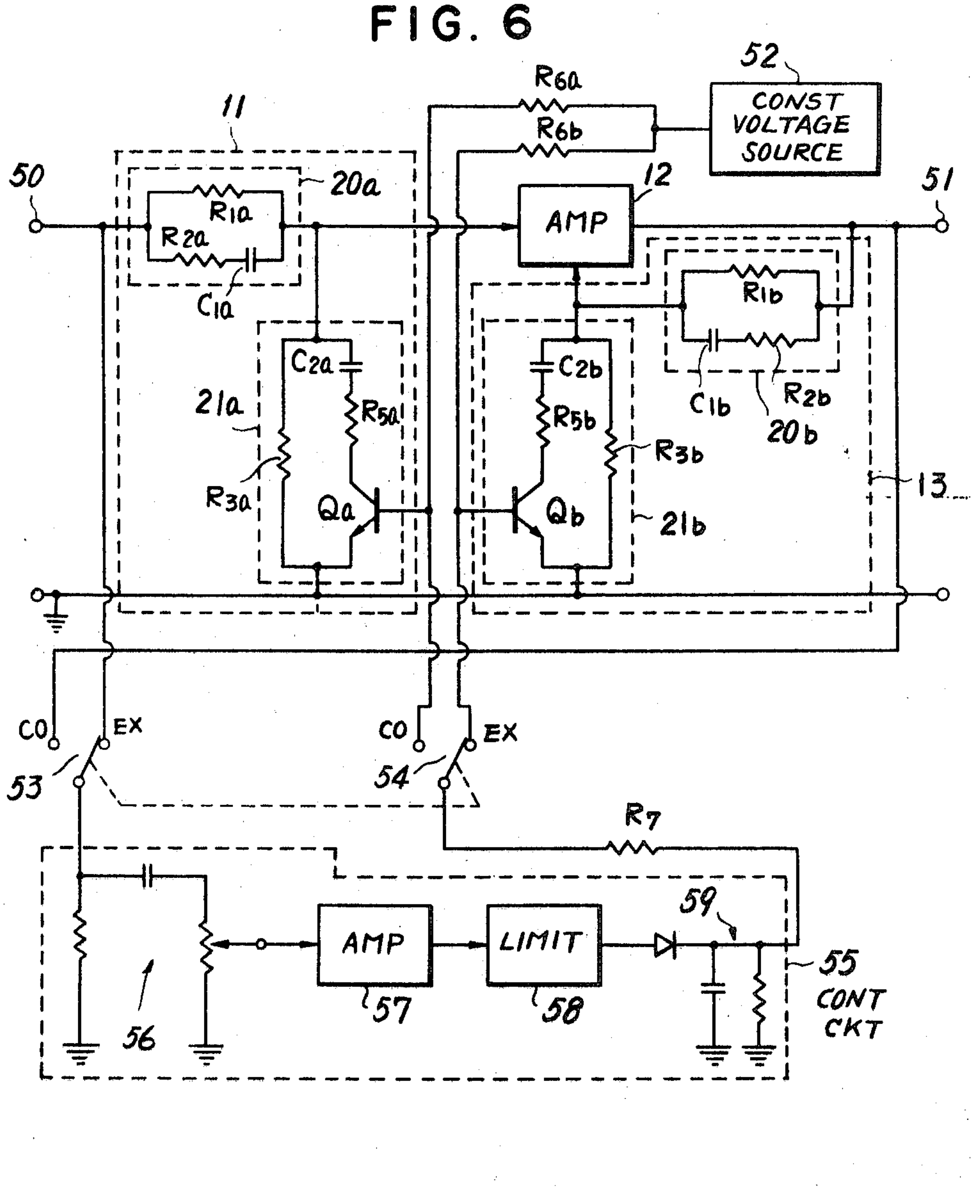
FIG. 6 is a circuit system diagram of one embodiment of a compandor circuit of the invention.

FIG. 6 shows a circuit diagram of an embodiment of the compandor system according to this invention which can be operated either as a compressor or an expandor by the switchover operation of a switching means. This circuit is eminently suitable for use in a recording and reproducing apparatus. A detailed description of this circuit is omitted herein, like reference numerals and characters being used to designate like component parts of the circuit of FIG. 6 as those used in FIG. 4.

Transistors Q*a* and Q*b* are used respectively as control elements corresponding to the variable resistor elements $R_{4a}$ and $R_{4b}$ in the frequency characteristic changing circuits 21*a* and 21*b*. To the collectors of the transistors Qa and Qb, resistors $R_{5a}$ and $R_{5b}$ are respectively connected. The resistance values of the resistors $R_{5a}$ and $R_{5b}$ are so selected respectively that the resultant resistance values of the resistors $R_{5a}$ and $R_{5b}$ and the collector-emitter resistances of the transistors Q*a* and Q*b* become equivalent to the resistance values of the resistors $R_{4a}$ and $R_{4b}$. To the base electrodes of the transistors Q*a* and Q*b*, a constant bias voltage is applied from a constant-voltage power supply 52 respectively through resistors $R_{6a}$ and $R_{6b}$.

A control circuit described hereinafter is connectable to the above described circuits through switches 53 and 54. The switch 53 comprises a contact CO connected to the output side of the amplifier 12, a contact EX connected to the input side of the circuit 11, and a moving contact piece that can be switched between the contacts CO and EX. The switch 54 comprises contacts CO and EX respectively connected to the bases of the transistors $Qa$ and $Qb$ and a moving contact piece that can be switched between the two contacts. The contact pieces of the switches 53 and 54 are connected by an interlocking mechanism. The control circuit 55 is composed of a high-pass filter circuit 56 connected to the contact piece of the switch 53 and comprising a capacitor and a resistor, an amplifier 57, a limiter 58, and a rectifying filter circuit 59. The output end of the rectifying circuit 59 is connected to the moving contact piece of the switch 54. The characteristic of the high-pass filter 56 is so designed that only the signal components in a frequency band to become the subject of compression and expansion will be filtered. A band-pass filter may be used in substitution for the high-pass filter.

When the recording and reproducing apparatus incorporating a circuit according to this embodiment is operated in the recording mode, the moving contact pieces of the switches 53 and 54, interlocked for this operation, are switched over to respective contacts CO. A signal from a signal source is applied to an input terminal 50 and an output control signal from the control circuit 55, applied with an output from an amplifier 12, is applied to the base of the transistor $Qa$ through a resistor $R_7$. On the other hand, the transistor $Qb$ is applied with merely a constant bias voltage at its base from the power supply 52. Accordingly, the circuit 21*a* operates as a variable frequency characteristic changing circuit, whereas the circuit 21*b* operates as a fixed frequency characteristic changing circuit. Thus the overall circuit shown in FIG. 6 operates as a compressor. From an output terminal 51 a compressed signal is derived, which is then recorded on a recording medium.

By operating the recording and reproducing apparatus in the reproducing mode, the moving contact pieces of the switches 53 and 54, interlocked for this operation, are switched over from their respective contacts CO to EX. Then a compressed signal reproduced from the recording medium is applied to the input terminal 50. By the switching operation of the switches 53 and 54, a reproduced signal is fed to the control circuit 55 from the input terminal 50. A control signal from the control circuit 55 is applied to the base of the transistor $Qb$. On the other hand, the transistor $Qa$ is applied with merely a constant bias voltage at its base from a power supply 52. As a consequence, the circuit 21*a* operates as a fixed frequency characteristic changing circuit, whereas the circuit 21*b* operates as a variable frequency characteristic changing circuit. Thus, the overall circuit shown in FIG. 6 operates as an expandor as has been mentioned in conjunction with FIG. 5. A reproduced signal with an optimum signal-to-noise ratio which has been expanded and restored to the original frequency response characteristic is derived from the output terminal 51.

In the circuit according to this embodiment, the same control circuit 55 is used for both the compressor and the expandor. Therefore, the previously mentioned condition of compression ratio $K$ = feedback factor $\beta$ can be exactly satisfied. Further, the circuits 11 and 13 can be used for the compressor and the expandor by a switchover operation. This contributes greatly to simplicity of the circuit construction.

Further, this invention is not limited to these embodiments but various variations and modifications may be made without departing from the scope and spirit of the invention.

What I claim is:

1. A compressing circuit comprising:

a first circuit means comprising a first frequency characteristic changing circuit means having a specific fixed frequency response characteristic which reinforces the level of an input signal in a predetermined frequency band, and a second frequency characteristic changing circuit means including a control element the resistance of which is varied in accordance with a voltage applied thereto and having a frequency response characteristic which is variable between a characteristic complementary with said frequency response characteristic of said first frequency characteristic changing circuit means and a flat characteristic;

an amplifier means connected in series with said first circuit;

a second circuit means provided in a negative feedback loop connected between the output side and the input side of said amplifier and comprising a third frequency characteristic changing circuit means with substantially the same circuit construction as said first frequency characteristic changing circuit means and a fourth frequency characteristic changing circuit means with substantially the same circuit construction as said second frequency characteristic changing circuit means;

a control circuit means for generating, in response to the input signal level, a control signal voltage for application to said control element in said second frequency characteristic changing circuit means and for controlling the characteristic of said second frequency characteristic changing circuit means, and means whereby the second frequency characteristic changing circuit means causes the input signal to change in a manner which approaches the complementary characteristic when said input signal has a higher level and in a manner which approaches the flat response when said input signal has a lower level; and a voltage supply circuit means for supplying a constant voltage to a control element means in said fourth frequency characteristic changing circuit means to make a frequency response characteristic of said fourth frequency characteristic changing circuit means a fixed characteristic.

2. The compressing circuit according to claim 1, wherein said fourth frequency characteristic changing circuit means, applied with said constant voltage, manifests a characteristic complementary with the frequency response characteristic of said third frequency characteristic changing circuit means and said second circuit means manifests a resultant flat frequency response characteristic.

3. The compressing circuit according to claim 1, wherein said control circuit means, applied with an output signal from said amplifier means as an input signal to said control circuit means, produces a control signal voltage in response to the level of said input signal.

4. The compressing circuit according to claim 1, wherein said control circuit means comprises a filter means for filtering a signal in a predetermined frequency band out of an input signal and a level detector means for detecting the level of said signal filtered by said filter means and for generating said control signal voltage.

5. An expanding circuit for expanding a transmitted signal which has been compressed by the compressing circuit according to claim 1 comprising:

a third circuit means comprising a fifth frequency characteristic changing circuit means having a specific fixed frequency response characteristic in a predetermined frequency range and a sixth frequency characteristic changing circuit means including a control element, the resistance of which is varied in response to a voltage applied thereto;

a second amplifier means connected in series with said third circuit means;

a fourth circuit means provided in a negative feedback loop connected between the output side and the input side of said second amplifier means and comprising a seventh frequency characteristic changing circuit means with substantially the same circuit construction as said fifth frequency characteristic changing circuit means and an eighth frequency characteristic changing circuit means with substantially the same circuit construction as said first frequency characteristic changing circuit means, which is capable of varying its frequency response between a characteristic which is complementary with a frequency response characteristic of said seventh frequency characteristic changing circuit means and a flat characteristic;

a second voltage supply circuit means which supplies a constant voltage to a control element in said sixth frequency characteristic changing circuit means and makes the frequency response characteristic of said fifth frequency characteristic changing circuit means a fixed characteristic; and a second control circuit means for generating, in response to the level of a signal transmitted from said compressing circuit, a control signal voltage for application to a control element contained in said eighth frequency characteristic changing circuit means, and means whereby said control signal voltage causes said eighth frequency characteristic changing circuit means to cause the input signal to approach the complementary characteristic when said input signal has a higher level and to approach the flat characteristic when said input signal has a lower level.

6. The expanding circuit according to claim 5, wherein said fifth frequency characteristic changing circuit means has substantially the same circuit construction as said first frequency characteristic changing circuit means, which said sixth frequency characteristic changing circuit means has substantially the same circuit construction as said second frequency characteristic changing circuit means.

7. The expanding circuit according to claim 6, wherein said seventh frequency characteristic changing circuit means has a specific fixed frequency response characteristic which reinforces the level of an input signal to said circuit in a predetermined frequency band, said fourth circuit means manifests, in itself, a characteristic which approaches a flat characteristic when the level of an input signal fed to said fourth circuit means is a relatively higher level, and which reinforces the level of said input signal in said predetermined frequency band when said input signal is a relatively lower level, and said amplifier means and its associated negative feedback loop including said fourth circuit means attenuates said input signal with a characteristic which is opposite to the characteristic of said fourth circuit.

8. The expanding circuit according to claim 5, wherein said sixth frequency characteristic changing circuit means, applied with said constant voltage, manifests a characteristic which is complementary with a frequency response characteristic of said fifth frequency characteristic changing circuit means, and said third circuit means has a resultant flat frequency response characteristic.

9. The expanding circuit according to claim 5, wherein said second control circuit means, applied with an input signal to said second amplifier means as an input signal to said second control circuit means, produces a control signal voltage in response to said signal level.

10. The expanding circuit according to claim 5, wherein said second control circuit means comprises a second filter means for filtering a signal in a predetermined frequency band out of said input signal and a second level detector means for detecting the level of a signal filtered by said filter means and producing said control signal voltage.

11. A compressing and expanding circuit comprising:

a first circuit comprising a first frequency characteristic changing circuit means having a specific fixed frequency response characteristic which reinforces the level of an input signal in a predetermined frequency band, and a second frequency characteristic changing circuit means including a control element the resistance of which varies in response to a voltage applied thereto and having a frequency response characteristic which is variable between a characteristic complementary with the frequency response characteristic of said first frequency characteristic changing circuit means and a flat characteristic;

an amplifier means connected in series with said first circuit;

a second circuit means provided in a negative feedback loop connected between the output side and the input side of said amplifier means and comprising a third frequency characteristic changing circuit means having substantially the same circuit construction as said first frequency characteristic changing circuit means, and a fourth frequency characteristic changing circuit means having substantially the same circuit construction as said second frequency characteristic changing circuit means;

a control circuit means for producing a control signal voltage in response to the level of the input signal;

a voltage supply circuit means for supplying a constant bias voltage to each of the control elements in said second and fourth frequency characteristic changing circuit means;

first switching means for switching over an input to said control circuit means respectively to an output signal from said amplifier means or an input signal to said first circuit means in accordance with the compression or expansion mode; and second switching means for switching over the output control signal voltage from said control circuit means as a supply voltage to said second frequency characteristic changing circuit means or to said fourth frequency characteristic changing circuit means in accordance with the compression or expansion mode.

* * * * *